(12) United States Patent
Sauer

(10) Patent No.: US 7,114,702 B2
(45) Date of Patent: Oct. 3, 2006

(54) SLIDE VALVE

(75) Inventor: Andreas Sauer, Grossostheim (DE)

(73) Assignee: Applied Films GmbH & Co. KG, Alzenau (DE)

( * ) Notice: Subject to any disclaimer, the term of this patent is extended or adjusted under 35 U.S.C. 154(b) by 0 days.

(21) Appl. No.: 10/928,326

(22) Filed: Aug. 27, 2004

(65) Prior Publication Data

US 2005/0199849 A1    Sep. 15, 2005

(30) Foreign Application Priority Data

Mar. 15, 2004  (EP) .................................. 04006114

(51) Int. Cl.
*F16K 25/00*   (2006.01)
*F16K 3/00*    (2006.01)

(52) U.S. Cl. ........................ 251/195; 251/172; 251/327

(58) Field of Classification Search ................ 251/172, 251/195, 326, 327
See application file for complete search history.

(56) References Cited

U.S. PATENT DOCUMENTS

| | | | | |
|---|---|---|---|---|
| 2,732,170 A | * | 1/1956 | Shand | 251/172 |
| 3,321,176 A | * | 5/1967 | Bolling, Jr. | 251/172 |
| 3,367,625 A | * | 2/1968 | Fortune | 251/172 |
| 3,497,177 A | * | 2/1970 | Hulsey | 251/172 |
| 4,136,710 A | * | 1/1979 | Bond | 137/375 |
| 4,157,169 A | * | 6/1979 | Norman | 251/195 |
| 4,292,992 A | * | 10/1981 | Bhide' | 137/340 |
| 4,561,472 A | * | 12/1985 | Dreyer et al. | 138/94.3 |
| 6,302,372 B1 | | 10/2001 | Sauer et al. | 251/167 |
| 6,564,818 B1 | * | 5/2003 | Kroeker et al. | 137/15.23 |

FOREIGN PATENT DOCUMENTS

DE          44 46 946 C1    12/2004

* cited by examiner

*Primary Examiner*—Justine R. Yu
*Assistant Examiner*—Andrew J. Rost
(74) *Attorney, Agent, or Firm*—Sheridan Ross P.C.

(57) ABSTRACT

In a slide valve, especially for coating installations, for fluidic separation of two modules or chambers, interconnected through an opening, containing at least one slide plate, integrated in a housing transfixed by said opening, and which may be bidirectionally moved between an inactive position, releasing said opening, and an operating position, completely covering said opening, and at least a closing drive, which may be activated to act upon said slide plate in its operating position and for its sealing contact in a closed position against a sealing surface transfixing said housing, according to the invention, at least one of said closing drives is firmly attached inside housing, relative to the activating movement of said slide plate.

20 Claims, 2 Drawing Sheets

SLIDE VALVE

FIELD OF THE INVENTION

The present invention refers to a slide valve for separation of two subsequent modules or chambers having separately adjustable pressure levels, wherein the modules are adapted for coating units.

BACKGROUND OF THE INVENTION

Valves of this type are frequently assembled in continuous coating units, designed for vacuum coating of flexible belt substrates, for example plastic foils, magnetic tapes, films etc., or also of rigid substrates, such as plastic or glass panes.

In is accordingly required, within certain time intervals, to introduce into the unit the belt substrates or foils, which are rolled in bales or foils, placing said substrates on a supporting axis, so that during the passage through the coating unit they may unroll from the bale.

Downstream of the coating chamber(s) another axis with a take-up drum is foreseen, on which the coated belt substrate is again being wrapped up.

Rigid substrates, placed on rollers, are continuously being transported between loading and unloading stations, which, on their turn, are being regularly ventilated.

Such continuous coating units are basically subdivided into modules (loading, coating and unloading module), which are sequentially disposed and interconnected by means of openings, through which substrate is being conducted into the subsequent module. It may be required to flood only one coating module, for example, in order to exchange a spray cathode or to accomplish other maintenance tasks, while the contiguous modules may preserve their present pressure level.

Therefore, reversible sluice valves are being integrated between the different modules. Thus, the volume to be exhausted after vacuum operations of the unit module, is being clearly reduced, since only individual stations are being ventilated and the other stations may remain in the evacuated condition. Evidently, in case of need, the entire unit may be ventilated.

Therefore, these valves do not have to continuously operate in a reversible fashion, i.e. bidirectionally, but lastly only have to be used or activated in case of changes of loads or other conditions of paralysation of the unit, in such case have to seal an existing pressure differential between atmospheric pressure and vacuum. The assembly position of these valves forcibly is directly in the area of the substrate transportation systems. In the case of glass coating units, these transportation systems are built as roller sections with definite roller distances. Due to continuously growing demand from clients, such as progressively smaller substrate dimensions and growing speed of passage, it is required to reciprocally shorten the distance of the different transportation rollers. This fact requires a very narrow separator or sluice valve, since it has to be integrated between two roller transporters, one roller transporter being provided in one module (upstream) and the subsequent roller transporter in the other module (downstream).

The document defining this feature DE 198 57 201 A1, describes such a plane sluice valve for simultaneous blocking or release of two reciprocally aligned passage openings, foreseen between two vacuum chambers, which feature a smaller height and larger width. The valve is designed for continuous coating units of large glass formats.

SUMMARY OF THE INVENTION

For closing purposes of the openings, two reciprocally opposed valve or slide plates are foreseen. These form a constructive unit, which, by means of a first actuator, are movable in a translatory direction to and from, between an inactive position, in which the openings are unobstructed, and an operating position. In the operating position, the slide plates are situated between the openings which they cover completely.

Between both slide plates, which, in the inactive position are reciprocally compressed in an elastic fashion and initially do not close these openings also in the operating position in a sealed condition, an additional fluid short-stroke closing (pneumatic) mechanism is provided, which is being pressurized after slide plates have been moved to their operating position, expanding both plates until, in their closed position, they are propped up simultaneously against the assigned sealing and which involve the openings, thus tightly obstructing said openings. The reactional forces of the closing mechanism are offset by the opposed valve plate.

To open said valve, actuator pressurization is cancelled; said actuator may additionally be exposed to subpressure in the reverse direction, in order to reinforce molar forces retroacting upon said slide plates. In this known valve, elastic sealing rings are introduced in grooves of the slide plates.

U.S. Pat. No. 4,157,169 reveals another sluice valve, basically quite similar to the unit above explained, designed to open and close two round passage openings. No soft sealing rings are foreseen here, but valve seats in the form of soft metal supports on the borders of the openings, with which sealing rings correspond, also made of soft metal and provided at the slide plates.

With both solutions, the fluid closing mechanism of the slide plates and consequently also their supply lines have to be reversibly moved between an inactive and operating position, also during reserving operational procedures. Subsequently, the mobile slide parts are relatively complex and expensive.

DE 44 46 946 C1 explains another similar slide valve with a valve disc, moveable from an inactive into an operating position, having the form of a simple plate. This document provides no indications regarding the sealing compression of this valve disc on its valve seat and the form of construction of the seals used. In addition, since only on one side of the slide plate a valve seat is foreseen, this slide valve has only one active direction.

The object of the present invention is to provide an especially plane slide valve, which is adequate for being assembled, especially between two closely sequential rollers of a continuous coating unit, supporting both intense pressure differentials and sealing in a reliable fashion, and its mobile parts should be constructed as simply as possible.

The invention describes a valve, which, preferentially, is either used as a maintenance valve or as a valve with reduced cyclic rates, i.e. which does not have to be activated too frequently. The construction is similar to a slide valve of a very plane construction (max. 50 mm), vacuum-sealed on both sides. Due to its operating principle, it is possible to reliably seal off also openings in the form of fissures of great length. The valve is also in condition to offset extensive rugosities of the opening, which is to be closed, which is being materialized with the highly flexible form of construction of its slide plate.

With the valve according to the invention, a simple plate inside a housing, is moved from an inactive position into its working position, preferably by means of a random externally powered actuator, in front of the opening to be closed. Basically, also a manual reversal of the slide plate between inactive and working position would be feasible, and this option may be foreseen in addition to an existing actuator for emergency cases.

To close the opening, by means of a closing mechanism which is part of the housing, said plate is being pressed towards a housing wall, where the corresponding sealing surface is provided.

Consequently, reaction forces of the closing mechanism are advantageously neutralized directly inside the solid housing.

The closing movement of the valve according to the invention, i.e. of its slide plate, takes place in an angular direction, preferably in a rectangle towards the activating movement between the inactive and the operating position of its slide plate.

As with the state of the art, a difference is being made also with the slide valve of the present invention between the actuator and the effective closing mechanisms.

In a specially preferred embodiment, the slide valve of the present invention is built pursuant to specular symmetry with two closing mechanisms and two sealing surfaces, so that it may occupy two different closing positions. Pursuant to an advantageous embodiment of the present invention, according to the direction of the pressure differential, said slide valve may always selectively be closed, so that the more intense pressure on one side additionally reinforces the sealing effect.

The slide plate is suspended in a pendulous fashion in the sealing direction, and, consequently, during adjusting operations between inactive and operational position, is essentially devoid of friction; this minimizes or also avoids sealing surface wear and tear. The expression "pendulous" does not imply, however, in mobility over longer routes or strokes. On the contrary, in a transversal adjusting position between an inactive and operational position, the slide plate has certain more reduced levels of freedom, which are effectively to be regarded as a limited lateral clearance. For a trustworthy function of the slide valve, it may suffice to move, i.e. deflect the slide plate only a few tenth millimeters from its operational into its respective sealing position.

Preferably, the closing mechanisms may be activated by fluid pressure, i.e. they encompass at least one closed compartment with a pressure connection, having at least one moveable wall. It is not absolutely required that these closing mechanisms extend entirely over the whole opening, but basically one may provide a closing mechanism which is subdivided into various segments of individual regulating mechanisms (as is being similarly described in the state of art, forming this type of device). In the case of the present embodiment, although not absolutely required from a functional viewpoint, evidently a uniform distribution of the different propulsion components should be preferred alongside the peripheral section of the opening to be closed.

Especially preferred is a version, closed in a fashion similar to a ring and similar to a tire tube of the closing mechanism, since in this version, as an additional sealing ring, it may also be propped up against the slide plate with smooth walls, thus avoiding, for example also the (unwanted) application of coating particles, (also called overspray), on the real sealing rings, which, all the way from the vacuum chamber, may reach the opening and the valve.

Preferably the closing mechanisms and the corresponding seals (these may advantageously be manufactured as annular seals in form of round-cords and the like which are introduced into grooves) are integrated in concentric routes around the openings to be closed, and the closing mechanisms may be disposed outside or inside the areas involved by these seals.

In the second disposition mentioned, as already pointed out, the closing mechanisms largely protect the sealing rings against undesired deposits.

As a whole, this embodiment with a simple, smooth slide plate, offers the considerable advantage that long-wavelike rugosities of the sealing surfaces may be offset with the specific flexibility of the slide plate, applied extensively and encompassing the entire circumference of the opening to be closed, so that even a small distortion of the sealing seat would not forcibly result in leakiness of the slide valve of the invention, due to measurement or surface deviations or not uniform tightening of screws, etc. Especially, it is also possible to seal safely large, slotted openings of various meters width, which, for example, are common and required in continuous coating devices for glass plates of more than 3 m width, against pressure differentials between vacuum- and atmospheric pressure.

One may also imagine an operating mode of the slide valve of the present invention with simultaneous activation of both closing mechanisms (peripherally closed), and each closing mechanism composes a combination, consisting of propulsion device and sealing surface. It would nevertheless also not be possible to waive separate sealing rings, because one must constantly consider the possibility of (undesired) deposits on the closing mechanisms, resulting from the coating process, which, on the long run, could negatively affect the sealing properties.

Other details and advantages of the object of the present invention may be seen from the drawing featuring an example and from the detailed and subsequent description.

DETAILED DESCRIPTION OF THE INVENTION

Figure 1:
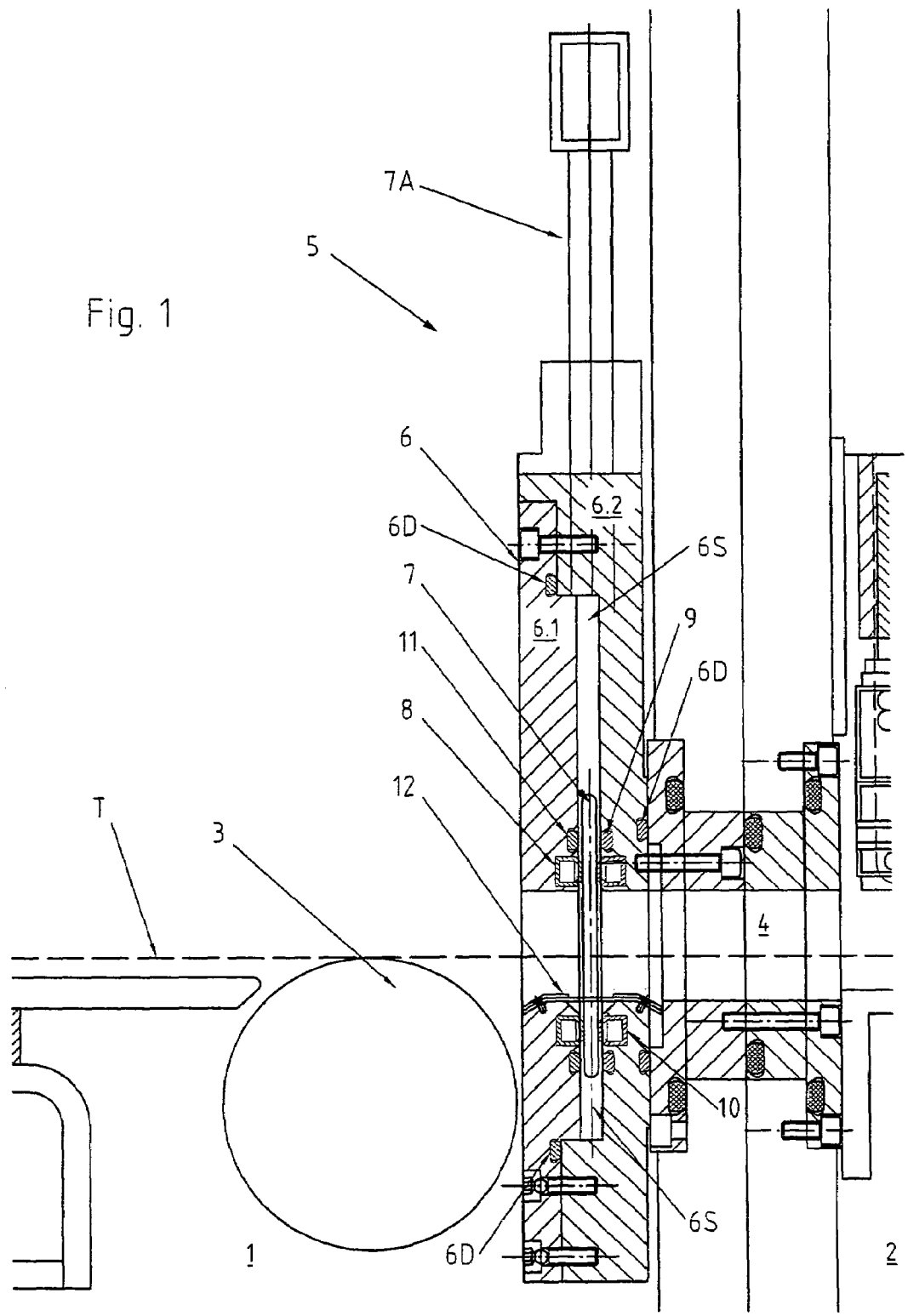
FIG. 1 indicates schematically a cut through the slide valve of the invention, in the operating position of the slide plate.

This cut shows the transition between two modules 1,2 of a continuous coating device. It is assumed here that individual substrates (only indicated here by a horizontal transportation plane T) cross this transition from the left to the right, and are being supported by immediately adjacent rollers 3 (in the relatively short section of the installation shown, only one roller 3 is schematically represented).

Between both modules 1 and 2, an opening 4 is foreseen, which, in a vertical sense towards the plane of the drawing, may clearly feature larger dimensions than in its now visible height, i.e. they may be considered in a slotlike fashion, but, as a whole, are manufactured with the smallest possible transversal cross-section. In the preferred case of utilization, it has to be sufficiently large in order to enable passage of smooth glass plates of more than 3 m width.

Both modules may be recognized in the area of opening 4, quite firmly and closely interconnected, in order to avoid any possible formation of collateral current, when this opening 4 is closed with the slide valve which will now be described, and when for instance in module 2 there is a state of vacuum, while module 1 is being ventilated.

The slide valve 5 encompasses initially a housing 6 with two housing sections 6.1 and 6.2. It is understood that this housing 6 is specifically quite well sealed, being composed of different construction components. One recognizes, for example, a sealing ring 6D here in the slot between both housing sections 6.1 and 6.2 and another sealing ring 6D in the slot between housing section 6.2 and the transition wall, onto which housing 6 is assembled in the area of opening 4.

Housing 6 is also completely transfixed by opening 4, i.e. it has a channel, forming an extension of said opening 4 with constant free cross-section.

It can be recognized that, contrary to the initially mentioned state of the art, this slide valve does not have to be integrated between the two modules 1 and 2, but its housing 6 is screwed on one side to the wall of module 1. A certain reduction of the distance between both modules becomes thus possible. In the same fashion, evidently according to type of installation and construction space, it is possible to assemble the valve according to the invention, also in a slot, an intermediate area or transition between two modules, when its channel would be located between the two openings of the modules, which are here directly interconnected.

Both housing sections 6.1 and 6.2 form between themselves a guiding slot 6S, in which a slide valve 7 is assembled in a pendulous fashion with reduced lateral clearance, i.e. seen in the normal direction towards its main areas. It is suspended on a translatory actuator 7a, not shown in detail.

The actuator component not shown here in detail, pertaining to said actuator unit, is adequately united with slide plate 7, in order to enable its lateral deflections. This connection between actuator 7a and slide plate 7 transfixes said housing 6. Special sealing measures at this point will only be required in the event actuator 7a should be provided outside module 1, i.e. outside of the volume which may be evacuated.

The (vertical) guide slot 6S extends itself, in the same way as the slide plate integrated therein, in a transversal (horizontal)axis of opening 4, in segments along both sides of the plane of transportation T. Its essential longitudinal section is located above the plane of transportation T, but a short segment is also foreseen underneath.

Figure 2:
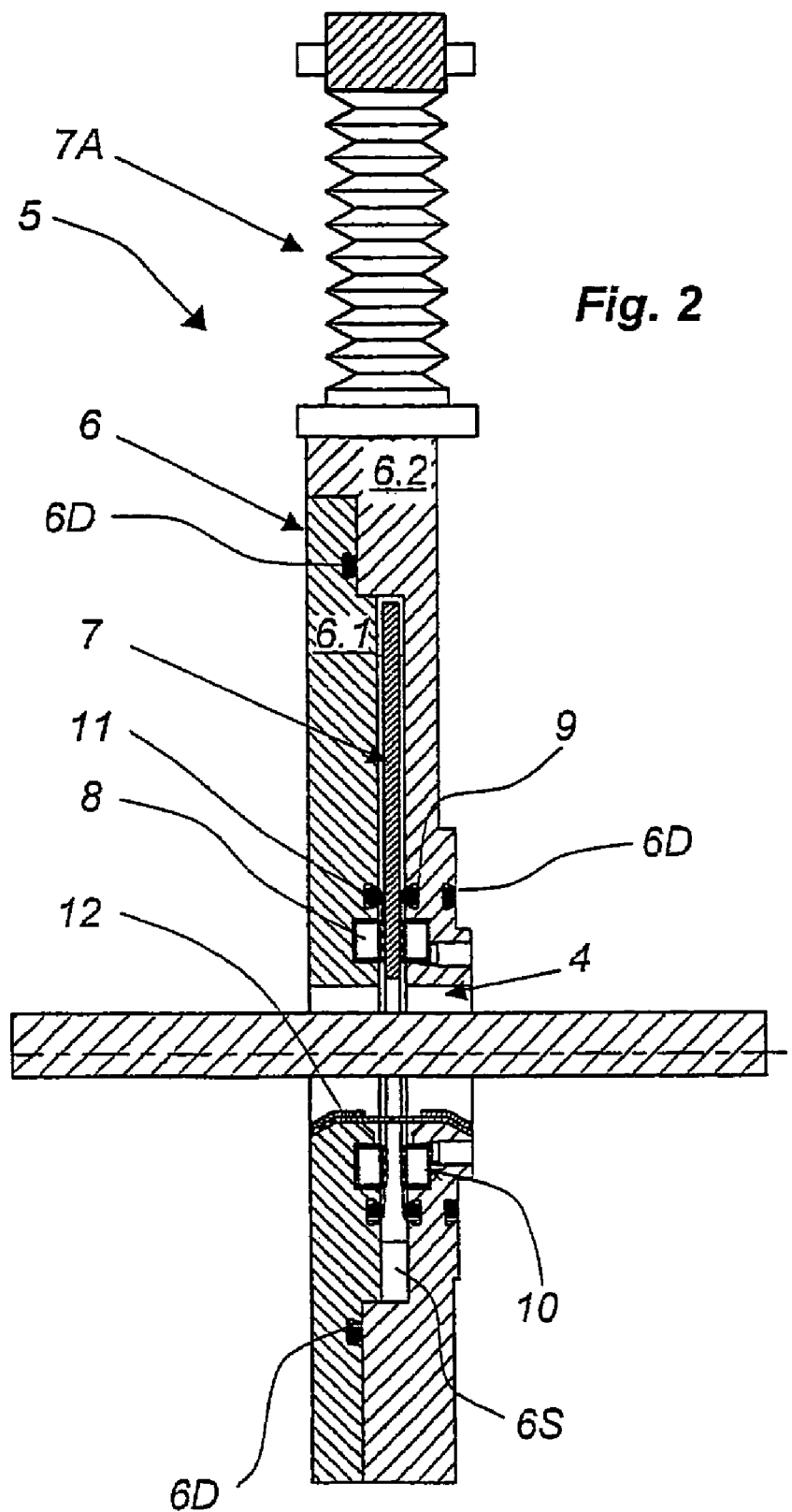
FIG. 2 shows the same cut in the inactive position of the slide plate.

Inside of guide slot 6S, slide plate 7 may be adjusted bidirectionally between an inactive position (see FIG. 2), in which opening 4 is wholly opened and the substrates may pass through, and the operating or closing position shown here, in which slide plate 7 totally covers said slotlike opening 4.

In the inactive position, slide plate 7 is wholly integrated into the upper portion of guide slot 6S, and in the operating position, its lower edge penetrates bladelike into the lower segment of guide slot 6S, while its upper portion still remains in its upper segment. It is essential that the slide plate 7 covers in all areas the border of opening 4.

The bidirectional, i.e. reversible, movement of slide plate 7 by means of the actuator 7a takes initially place freely, without a very tight displacement inside guide slot 6S, i.e. also with negligible friction. Consequently, actuator 7a is not required to apply extremely high adjusting forces. It can be, for example, a pneumatic or hydraulic lifting cylinder, a rack-and-pinion drive or an electromagnetic linear engine. It does not have to cover large strokes (a few centimeters) and should be in a condition to shift said sealing plate only in a relatively superficial movement towards its operating position.

Its connection with the slide plate nevertheless requires, as already mentioned, a certain degree of elasticity or articulateness, since slide plate 7, as will now be described, must also permit to be moved vertically towards the adjusting direction of the linear propulsion 7a, although only some reduced strokes. It is possible to provide here a fork, for example, at the end of the adjusting component of actuator 7a, whose two flanks are interconnected by means of one, two or more axes, at which the slide plate 7 is moveably suspended in the required fashion.

It should be noted that actuator 7a represents various similar synchronously commanded actuators, which are to be used in case of need, when slide plate 7 extends itself eventually over various meters length vertically towards the plane of drawing.

In the left half of housing 6.1 a first closing mechanism 8 is provided. It is preferably produced as an inflatable sealing, introduced into a circumferential annular slot of the housing wall, involving, on its turn, the entire circumference of opening 4. Functionally corresponding with this closing propulsion 8, an annular sealing 9 is provided, also inserted in an annular slot, and which also totally embraces opening 4.

Exactly opposed (relative to the middle plane of guide slot 6S and slide plate 7) to said closing mechanism 8, in the example shown, in the opposed wall of housing section 6.2. a second closing mechanism 10, of the same format as closing mechanism 8, is inserted. It is located inside the area circumscribed by annular seal 9.

With the closing mechanism 10, an annular seal 11 functionally corresponds, which is inserted into the wall of housing section 6.1, again exactly in a direction opposite of annular seal 9, circumferentially involving closing mechanism 8.

It is actually contingent upon the embodiment, whether the closing mechanisms 8 and 10 are disposed inside or outside of the areas circumscribed by sealing rings 9 and 11. In the last case, the closing mechanisms are protected on the closed side against influence of vacuum. In the first case, the closing mechanism protects against overspray the sealing ring, located on the same side.

As already indicated, it is not forcibly required to produce the closing mechanisms 8 and/or 10 as uniform, circumferential chambers, similar to tube tires. Especially it may also be considered to provide the closing mechanisms only as two parallel long and extended segments on both sides of opening 4, instead of providing them in a circumferential manner. This would also insure essential protection of the sealing rings against overspray.

In addition, a number of individual chambers could be uniformly distributed along the circumference of the sealing surfaces, which, evidently, would fluidically intercommunicate and would have to be synchronously exposed to pressure. This embodiment would have its advantages, even if in the respective section other functional components of the installation would have to be assembled, which would be incompatible with the transient closing mechanisms.

Also these varying dispositions, a sectional representation of the slide valve would not necessarily offer a different view than shown here, contingent upon the position of the line of intersection.

It is foreseen in the context of the present invention that only one of the closing drives may be foreseen, when the slide plate has to be prepared in a sealing position only in one direction.

The circumferential configuration of the closing drives 8 and 10 as herein explained, offers the advantage that with an adequate configuration of its outer sections, they are propped up as secondary seals on the smooth surface of slide plate 7, thus reinforcing the sealing action of sealing rings 9 respectively 11, as long as their inner area is pressurized.

Below plane of transportation T, in the area of opening 4 and of guide slot 6S, inside the housing a strip 12 of permanently elastic material is interchangeably attached. It closes the section of guide slot 6S, located below plane of transportation, and avoids penetration of particles into the lower section of guide slot 6S. It is built divided as a lip seal and permits free penetration of slide plate 7, once it is moved into its operating position.

It is understood that seal rings 9 and 11, as well as closing drives 8 and 10, are introduced to such an extent into the respective housing walls, i.e. may eventually therein be introduced by means of exposure to subpressure, so that it is possible to exclude damages or only friction by contacts with the slide plate 7 during the reversing movements between inactive and operation positions.

Additionally, by means of adequate protective measures, the activation of the actuator 7a should, of course, be avoided when one of the closing drives 8 and 10 is pressurized. A merely manual activation of slide plate 7 in the activated condition of one of the closing drives 8 or 10 should anyhow be impossible due to the intense compressing forces.

It can be seen that compared with the thickness of housing components 6.1 and 6.2, slide plate 7 may be produced in a quite slim and light fashion. In cooperation with a possibly uniform distribution of the closing forces, originated by closing drives 8,10, slide plate 7 will be able to adjust itself exactly to the course of the sealing rings 9 respectively 11, even when these should evidence small long-wave deviations from the ideal sealing plane.

In the normal case, slide plate 7 will be activated by actuator 7a when pressure in both modules to be reciprocally separated (still or again) is equal, i.e. when, for example, on both sides, atmospheric pressure or vacuum is applied.

Once its operating position has been attained (its lower edge is submerged in the lower portion of guide slot 6S), then in accordance with the direction of the pressure differential (f.ex. vacuum in module 2, atmospheric pressure in module 1 or vice-versa) still to be terminated (still to be formed), one of the closing drives 8 or 10 is fed/subject to internal pressure, when preferably the closing mechanism, not facing the lower pressure level, is being activated.

If, for example, in the closed position of slide valve 5, vacuum should be applied in module 2, the (left) closing mechanism 8 will be activated. Due to the resulting inflation of its transversal tube section, slide plate 7 will be forced against (the right) annular seal 9.

If, on the other hand, in the closed position of slide valve 6, pressure in module 1 should become smaller than pressure in module 2, then the (right) closing drive 10 will be activated in order to moveably force slide plate 7 against the (left) annular seal 11.

With this measure, the load of the flexible convex surface of closing drives 8 respectively 10 with excessive pressure differentials (internal pressure against vacuum) is being avoided.

Evidently, the compression force of closing drives 8 respectively 10 with growing formation of a pressure differential between modules 1 and 2, is being additionally reinforced, since the more intense pressure on one side of the slide plate 7 exerts a still stronger pressure on annular sealing 9 respectively 11.

It is, furthermore, understood that closing drives 8 and 10 are the effective valve drives, which insure the sealing function. Actuator 7a is only foreseen for placing said slide plate in its overall operating position, independently of the direction of the pressure differential. Consequently, the effective sealing function of slide valve 6, i.e. of the integral slide plate 7, can be used in both directions, by optionally activating one of the closing drives 8 or 10.

It can be seen that the example of execution above described and shown of slide valve 6, featuring its components with sealing functions, is built in specular symmetry and, therefore, is apt to sustain a high pressure differential bidirectionally over the plane of slide plate 7. However, one may also imagine its embodiment for only one sealing direction, when either closing drive 8 and annular seal 9 or closing drive 10 and annular seal 11 may be eliminated.

After decline of the pressure differential to be purged by slide valve 5, eventually also after active retraction of the formerly activated closing drive 8 or 10, activator 7a may again move slide plate towards its inactive position. Eventually, loosening of slide plate 7 from annular seals 9 or 11 may be reinforced by flat or cup springs, whose restoring force must be naturally overcome by the closing drives.

It is understood that the slide valve of the present invention, although having been described, based on a preferential embodiment for continuous coating installations for large-sized individual substrates, independently from this use may also be employed elsewhere.

The invention claimed is:

1. A slide valve, for separation of two subsequent modules or chambers, having separately adjustable pressure levels, wherein said modules are adapted for coating units, comprising:
   a housing;
   an opening transfixing said housing, having a cross-sectional area and a circumference;
   a slide plate, disposed within said housing, having an area greater than said cross-sectional area of said opening, said slide plate having a first side and a second side, and being bidirectionally moveable between an inactive position wherein said opening is completely uncovered, and an operating position wherein said opening is completely covered;
   a first sealing surface integrated within said housing for engaging said first side of said slide plate;
   a second sealing surface integrated within said housing for engaging said second side of said slide plate;
   a first closing drive integrated within said housing, disposed between said first sealing surface and said opening, and operable to engage said first surface of said slide plate in said operating position wherein said second surface of said slide plate is forced against said second sealing surface;
   a second closing drive integrated within said housing, disposed between said second sealing surface and said opening, and operable to engage said second surface of said slide plate in said operating position wherein said first surface of said slide plate is forced against said first sealing surface;
   wherein said first closing drive and second closing drive function in unison or independently from each other.

2. The slide valve according to claim 1, wherein said slide plate comprises a smooth and slim plate.

3. The slide valve according to claim 1, wherein said housing comprises at least two sections, forming between them a guide slot for said slide plate, wherein said guide slot is perpendicular to a longitudinal axis of said opening, said guide slot further comprising a first cavity sufficient to receive said slide plate in said inactive position, and and a second cavity sufficient to receive said slide plate in said operating position.

4. The slide valve according to claim 3 wherein in an assembled position, a section of guide slot, located underneath said opening, is covered by a lip seal, permitting penetration of said slide plate.

5. The slide valve according to claim 3, wherein each closing drive and each sealing surface for said slide plate are disposed or embedded in a wall of guide slot.

6. The slide valve according to claim 3, wherein said sections are screwed together.

7. The slide valve according to claim 1, wherein each closing drive can be activated by fluid pressure and comprises at least a closed compartment with a pressure connection, with at least one mobile wall section.

8. The slide valve according to claim 7, wherein said mobile wall of closing drive, then subject to pressure, acts directly upon said slide plate.

9. The slide valve according to claim 1, wherein said closing drives further comprise different individual actuator units, uniformly disposed alongside the circumference of said opening.

10. The slide valve according to claim 1, wherein said closing drives further comprise an individual circumferentially closed actuator, extending around said opening.

11. The slide valve according to claim 1, wherein said sealing surfaces are provided with annular seals, against which said slide plate can be compressed by said closing drives.

12. The slide valve according to claim 11, wherein said annular seals and said closing drives are disposed alongside parallel routes around a border of said opening.

13. The slide valve according to claim 1, further comprising at least one actuator, for adjusting the inactive and operating positions of said slide plate.

14. The slide valve according to claim 13, wherein said slide plate is movably connected to said at least one actuator, and is capable of movement in an adjusting direction, wherein said adjusting direction is defined by a line perpendicular to a plane defined by said slide plate.

15. The slide valve according to claim 13, wherein said actuator is tanslatory.

16. The slide valve according to claim 1, wherein said slide plate is suspended in a pendulous fashion and is movable in a direction defined by a line perpendicular to a plane defined by said slide plate.

17. An installation for processing comprising at least two adjacent modules interconnected over a passage opening and at least a slide valve, operable for closing said opening, comprising:

a housing;

a slide plate, disposed within said housing, having an area greater than a cross-sectional area of said opening, said slide plate having a first side and a second side, and being bidirectionally moveable between an inactive position wherein said opening is completely uncovered, and an operating position wherein said opening is completely covered;

a first sealing surface integrated within said housing for engaging said first side of said slide plate;

a second sealing surface integrated within said housing, for engaging said second side of said slide plate;

a first closing drive integrated within said housing, disposed between said first sealing surface and said opening, and operable to engage said first surface of said slide plate in said operating position wherein said second surface of said slide plate is forced against said second sealing surface;

a second closing drive integrated within said housing, disposed between said second sealing surface and said opening, and operable to engage said second surface of said slide plate in said operating position wherein said first surface of said slide plate is forced against said first sealing surface;

wherein said first closing drive and second closing drive function in unison or independently from each other.

18. The installation according to claim 17, wherein said housing of said slide valve is attached to an inner wall of one of the adjacent modules.

19. The installation according to claim 17 wherein said housing of said slide valve is attached in a slot between said two adjacent modules.

20. The installation according to claim 17, wherein said processing includes coating of substrates running through said passage opening.

* * * * *